(12) United States Patent
Kim

(10) Patent No.: US 10,807,455 B2
(45) Date of Patent: Oct. 20, 2020

(54) SUB-ROLL ROD DEVICE FOR MOUNTING POWERTRAIN OF VEHICLE

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 82 days.

(21) Appl. No.: 16/055,102

(22) Filed: Aug. 5, 2018

(65) Prior Publication Data

US 2019/0160932 A1 May 30, 2019

(30) Foreign Application Priority Data

Nov. 24, 2017 (KR) .................. 10-2017-0158371

(51) Int. Cl.
| | | |
|---|---|---|
| *B60K 1/00* | (2006.01) | |
| *B60K 5/12* | (2006.01) | |
| *F16F 1/38* | (2006.01) | |
| *F16F 15/08* | (2006.01) | |

(52) U.S. Cl.
CPC .......... *B60K 5/1241* (2013.01); *B60K 5/1216* (2013.01); *F16F 1/3849* (2013.01); *F16F 15/08* (2013.01); *B60K 5/1208* (2013.01)

(58) Field of Classification Search
CPC .. B60K 5/1241; B60K 5/1208; B60K 5/1216; B60K 5/12; B60K 5/1275; B60K 5/04; B60K 5/00; B60K 5/1225; B60K 5/1291; F16F 1/3849; F16F 15/08; F16F 15/00
See application file for complete search history.

(56) References Cited

U.S. PATENT DOCUMENTS

| | | | | |
|---|---|---|---|---|
| 4,518,058 | A * | 5/1985 | Fister ..................... | B60K 5/125 180/297 |
| 4,564,082 | A * | 1/1986 | Takehara ................. | B60K 5/04 180/291 |
| 4,779,834 | A * | 10/1988 | Bittner ................. | B60K 5/1241 180/300 |
| 5,035,296 | A * | 7/1991 | Sjostrand ............. | B60K 5/1216 180/292 |
| 5,133,427 | A * | 7/1992 | Arvidsson ............ | B60K 5/1216 180/297 |
| 5,267,630 | A * | 12/1993 | Watanabe ............ | B60G 15/067 180/297 |
| 5,992,555 | A * | 11/1999 | Sakamoto ............ | B60K 5/1216 180/232 |

(Continued)

*Primary Examiner* — James M Dolak
(74) *Attorney, Agent, or Firm* — Mintz Levin Cohn Ferris Glovsky and Popeo, P.C.; Peter F. Corless

(57) ABSTRACT

A sub-roll rod device for mounting a powertrain of a vehicle can, in addition to mounting the powertrain in an engine room of the vehicle using a mounting member in a three-point supporting method, mount the sub-roll rod that can be assembled with the powertrain in a side member of a vehicle body, thus controlling forward-and-backward movement of the powertrain while maintaining Noise, Vibration & Harshness (NVH) performance by the three-point supporting method and improving ease of assembly of the powertrain with respect to the engine room.

10 Claims, 7 Drawing Sheets

(56) References Cited

U.S. PATENT DOCUMENTS

| | | | | |
|---|---|---|---|---|
| 6,321,890 | B1 * | 11/2001 | Suzuki | B60K 5/1208 188/379 |
| 6,390,223 | B1 * | 5/2002 | Savage | B60K 5/1241 180/297 |
| 6,457,380 | B1 * | 10/2002 | Aazizou | B60K 5/1241 74/579 E |
| 6,679,523 | B2 * | 1/2004 | Yamamoto | B60G 7/02 180/311 |
| 6,708,793 | B2 * | 3/2004 | Witherspoon | B60K 5/1216 180/291 |
| 6,761,242 | B2 * | 7/2004 | Yoshida | B60K 5/12 180/232 |
| 7,413,050 | B2 * | 8/2008 | Miyagawa | B60K 5/1216 180/274 |
| 7,562,737 | B2 * | 7/2009 | Miyahara | B60K 5/04 180/291 |
| 7,779,957 | B2 * | 8/2010 | Mitake | B60K 5/04 180/291 |
| 8,042,793 | B2 * | 10/2011 | Igami | F16F 1/3835 180/297 |
| 8,313,078 | B2 * | 11/2012 | Suzuki | B60K 5/12 248/638 |
| 8,403,309 | B2 * | 3/2013 | Kamei | F16F 1/3863 267/140.2 |
| 8,439,377 | B2 * | 5/2013 | Kim | B62D 21/11 280/124.109 |
| 8,651,217 | B2 * | 2/2014 | Kim | B62D 21/11 180/291 |
| 8,794,605 | B2 * | 8/2014 | Mizobe | F16F 1/3828 180/296 |
| 8,839,899 | B2 * | 9/2014 | Kim | B60K 5/1216 180/291 |
| 8,839,900 | B2 * | 9/2014 | Kim | F16F 13/1463 180/312 |
| 9,004,468 | B2 * | 4/2015 | Kamei | B60K 5/1241 267/141.1 |
| 9,212,716 | B2 * | 12/2015 | Yoon | F16F 6/005 |
| 9,682,613 | B2 * | 6/2017 | Miya | B60K 5/1216 |
| 9,707,836 | B2 * | 7/2017 | Sykes | F16F 1/3849 |
| 10,208,825 | B2 * | 2/2019 | Satou | F16F 1/3849 |
| 10,215,091 | B2 * | 2/2019 | Kondo | F02B 75/04 |
| 10,654,351 | B2 * | 5/2020 | Han | B60K 5/1208 |
| 2007/0131469 | A1 * | 6/2007 | Kim | B60K 5/1216 180/293 |

* cited by examiner

SUB-ROLL ROD DEVICE FOR MOUNTING POWERTRAIN OF VEHICLE

CROSS-REFERENCE TO RELATED APPLICATION(S)

This application claims under 35 U.S.C. § 119(a) the benefit of Korean Patent Application No. 10-2017-0158371 filed on Nov. 24, 2017, the entire contents of which are incorporated herein by reference.

BACKGROUND

(a) Technical Field

The present disclosure relates to a sub-roll rod device for mounting a powertrain of a vehicle, and more particularly, to the sub-roll rod device, which can mount a sub-roll rod in a side member in order to be assembled with the powertrain, thus controlling forward-and-backward movement of the powertrain while improving ease of assembly of the powertrain.

(b) Description of the Related Art

Generally, when mounting a powertrain including an engine and a transmission in an engine room of a vehicle, it is mounted using a mounting member for controlling vibration control and rolling movement in a three-point supporting method.

Referring to the left drawing of FIG. 11, the mounting member can be an engine mount 102 mounted between an engine of a powertrain 100 and a vehicle body sub-frame 200 to support the engine, a transmission mount 104 mounted between a transmission of the powertrain 100 and the vehicle body sub-frame 200 to support the transmission, and a roll rod 106 for controlling the rolling movement of the powertrain 100, etc.

In case of mounting the powertrain in the three-point supporting method, there is an advantage for vibration control with respect to the powertrain, but there is also a disadvantage in that the powertrain greatly moves in the forward and backward directions under operating conditions such as rapid acceleration and rapid braking because of weak control of the forward-and-backward movement of the vehicle due to momentary vibration.

In addition, in the case of mounting the powertrain in the three-point supporting method, problems such as bolt loosening and breakage of the mounting member applied to a three-point supporting point may result from irregular vibration due to a high torque of the engine. In addition, in order to repair the broken bolt, etc., the mounting members (such as an engine mount, a transmission mount and a roll rod), etc. should be replaced with new products, resulting in excessive maintenance costs.

The above information disclosed in this Background section is only for enhancement of understanding of the background of the disclosure and therefore it may contain information that does not form the prior art that is already known in this country to a person of ordinary skill in the art.

SUMMARY

The present disclosure provides a sub-roll rod device for mounting a powertrain of a vehicle, which can, in addition to mounting the powertrain in an engine room of the vehicle using a mounting member in a three-point supporting method, mount a sub-roll rod that can be assembled with the powertrain in a side member of a vehicle body, thus controlling forward-and-backward movement of the powertrain while maintaining Noise, Vibration & Harshness (NVH) performance by the three-point supporting method, and improving the ease of assembly of the powertrain with respect to the engine room.

The present disclosure provides the sub-roll rod device for mounting the powertrain of the vehicle in which the powertrain is mounted in the engine room in the three-point supporting method using an engine mount mounted between an engine of the powertrain and a vehicle body sub-frame, a transmission mount mounted between a transmission of the powertrain and the vehicle body sub-frame, and a roll rod mounted between the rear portion of the powertrain and the vehicle body sub-frame, and a sub-roll rod is further mounted inside a side member near the vehicle body sub-frame in order to be fastened to a bracket formed on the engine.

Particularly, the sub-roll rod is characterized by including a body having a first through-hole and a second through-hole of different diameters; an engine fastening pipe located in the inner diameter center of the first through-hole of the body; a vehicle body fastening pipe located in the inner diameter center of the second through-hole of the body; a first elastic body interposed between the inner diameter surface of the first through-hole and the outer diameter surface of the engine fastening pipe; and a second elastic body interposed between the inner diameter surface of the second through-hole and the outer diameter surface of the vehicle body fastening pipe.

Preferably, a third elastic body for noise prevention is characterized by being forming on the outer surface of the portion where the first through-hole is formed among the outer surface of the body.

In addition, the first elastic body is characterized by being composed of an up-and-down directional elastic body vertically connecting the inner diameter surface of the first through-hole and the outer diameter surface of the engine fastening pipe, and a left-and-right directional elastic body formed at both sides of the inner diameter surface of the first through-hole in order to contact the outer diameter surface of the engine fastening pipe.

In addition, a sub-roll rod mounting hole is characterized by being formed by penetrating the side member, and a reinforcing case for mounting the sub-roll rod is characterized by being embedding inside the side member through the sub-roll rod mounting hole.

Particularly, the reinforcing case is characterized by being composed of a box structural body having a roll rod receiving space penetrated in the forward-and-backward in order to mount the sub-roll rod; a first fastening plate formed on the inner side portion of the box structural body and fastened with the side member, and a second fastening plate formed on the outer side portion of the box structural body and fastened with the sub-roll rod.

In addition, a sub-roll rod fixing bolt is characterized by being fastened in the vehicle body fastening pipe of the sub-roll rod through the second fastening plate.

Preferably, the sub-roll rod mounting hole formed on the side member is characterized by being covered by a wheel cover tightly coupled to the outside of the side member.

In addition, the bracket formed on the engine is characterized by being formed on a chain cover of the engine, and being provided as the structure that a hollow pipe where the engine fastening pipe of the sub-roll rod is inserted and fastened is formed to be protruded.

In addition, a reinforcing long bolt is characterized by being inserted into and fastened to the engine fastening pipe.

The present disclosure provides the following effects through the above-described configuration.

First, in addition to mounting the powertrain in the engine room in the conventional three-point supporting method, by mounting the sub-roll rod that can be assembled with the powertrain in the side member of the vehicle body to mount the powertrain in the three-plus-one supporting method in addition to the three-point supporting method, it is possible to maintain NVH performance by the conventional three-point supporting method, and to control the forward-and-backward movement of the powertrain by the sub-roll rod.

Second, because of the control of the forward-and-backward movement of the powertrain by the sub-roll rod, it is possible to absorb and remove impact and vibration when the powertrain greatly moves in the forward and backward while performing the roll (rotation) motion of the powertrain upon rapid acceleration and rapid braking of the vehicle.

Third, the sub-roll rod is mounted inside the side member, such that there is the advantage in that a separate package space is not needed, and particularly, by mounting the reinforcing case where the sub-roll rod is embedded, it is possible to increase the rigidity of the side member.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
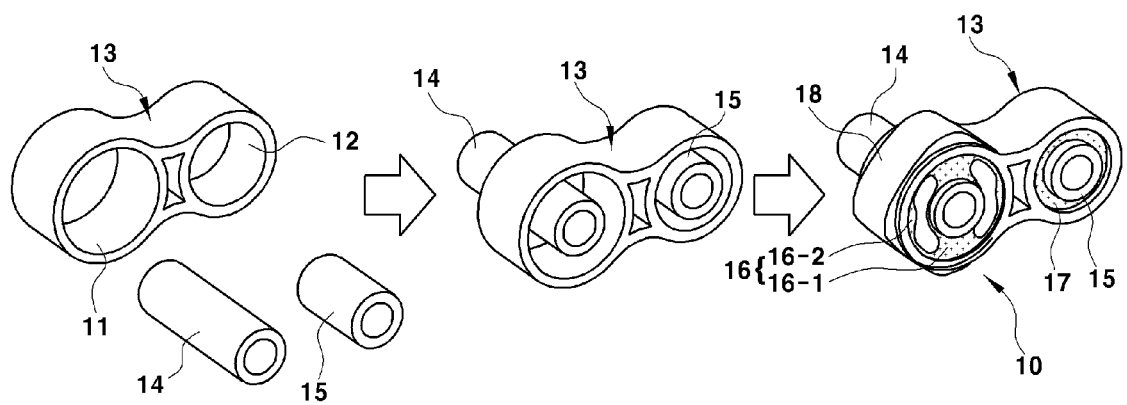
FIG. 1 is a perspective view illustrating a sub-roll rod device for mounting a powertrain in accordance with the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, the preferred embodiments of the present disclosure will be described in detail with reference to the accompanying drawings.

As described above, when mounting a powertrain including an engine and a transmission in an engine room, the powertrain is mounted in the engine room in a three-point supporting method using an engine mount mounted between the engine of the powertrain and a vehicle body sub-frame, a transmission mount mounted between the transmission of the powertrain and the vehicle body sub-frame, and a main roll rod mounted between the rear portion of the powertrain and the vehicle body sub-frame.

In addition to the three-point supporting method, the present disclosure further mounts a sub-roll rod inside a side member above the vehicle body sub-frame to be fastened to a bracket formed on the engine in order to mount the powertrain in a three-plus-one supporting method.

Figure 2:
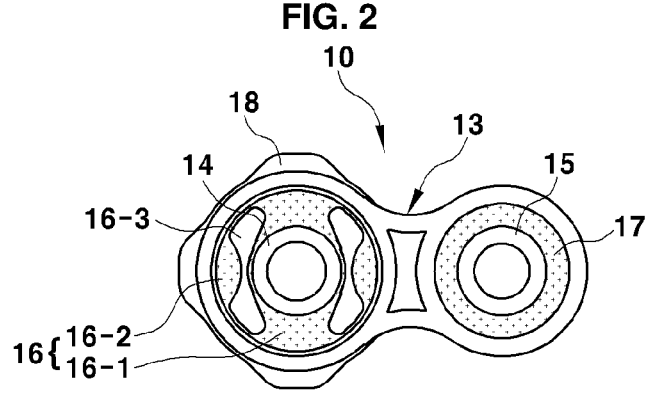
FIG. 2 is a side view illustrating the sub-roll rod device for mounting the powertrain in accordance with the present disclosure.

FIGS. 1 and 2 illustrate the sub-roll rod device for mounting the powertrain in accordance with the present disclosure.

A sub-roll rod 10 of the present disclosure uses a body 13 having a first through-hole 11 and a second through-hole 12 of different diameters as a skeleton, and the body 13 can be produced by extruding an aluminum material.

An engine fastening pipe 14 can be located in the inner diameter center of the first through-hole 11 of the body 13, a vehicle body fastening pipe 15 can be located in the inner diameter center of the second through-hole 12 of the body 13, and the engine fastening pipe 14 and the vehicle body fastening pipe 15 can be produced by extruding an aluminum material or pulling out a steel material.

In addition, a first elastic body 16, which cures the material having an elastic force such as a rubber, is interposed between the inner diameter surface of the first through-hole 11 of the body 13 and the outer diameter surface of the engine fastening pipe 14, and a second elastic body 17, which cures the material having an elastic force such as a rubber, is interposed between the inner diameter surface of the second through-hole 12 of the body 13 and the outer diameter surface of the vehicle body fastening pipe 15.

Since the first elastic body 16 supports the engine fastening pipe 14 connected with the engine side, the vertical vibration, the rolling vibration, etc. from the engine can be inputted to the first elastic body 16 through the engine fastening pipe 14, and thereby a deformation receiving space of the first elastic body 16 is needed.

Accordingly, the first elastic body 16 is composed of an up-and-down directional elastic body 16-1 vertically connecting the inner diameter surface of the first through-hole 11 and the outer diameter surface of the engine fastening pipe 14, and a left-and-right directional elastic body 16-2 formed at both sides of the inner diameter surface of the first through-hole 11 in order to contact the outer diameter surface of the engine fastening pipe 14, such that the space between the up-and-down directional elastic body 16-1 and the left-and-right directional elastic body 16-2 becomes a deformation receiving space 16-3 of the first elastic body 16.

In addition, a third elastic body 18 for noise prevention is further cured to be formed on the outer surface of the portion where the first through-hole 11 is formed among the outer surface of the body 13.

The third elastic body 18 is, as will be described later, tightly supported on the inner surface of a reinforcing case 30 mounted inside a side member 20 to function as a stopper absorbing and buffering various vibrations.

For example, if the third elastic body 18 is not present, the outer surface of the body 13 and the inner surface of the reinforcing case 30 may be subject to various vibrations and impacts including noise, but the third elastic body 18 is formed on the outer surface of the body 13 to function as the stopper for buffering various vibrations and impacts while directly contacting the inner surface of the reinforcing case 30.

The sub-roll rod 10 having the above configuration is mounted inside the side member 20 near the vehicle body sub-frame.

Figure 3:
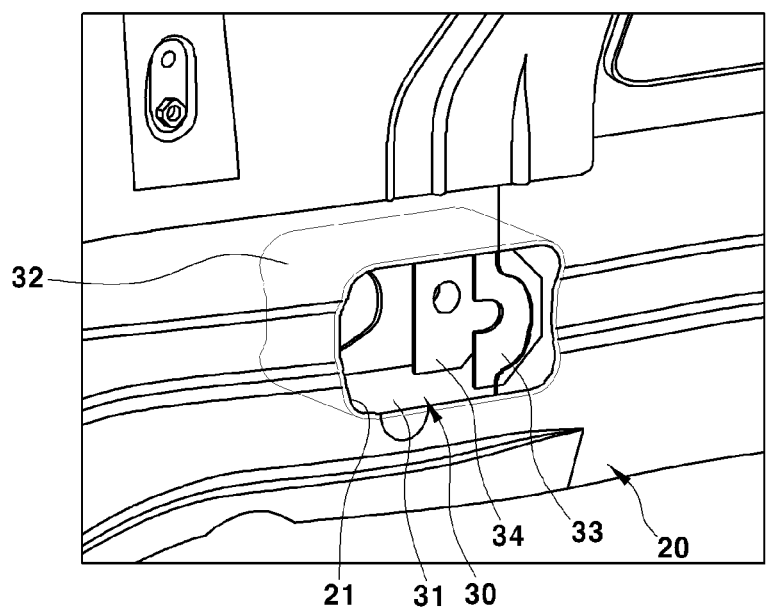
FIGS. 3 and 4 are perspective views illustrating the structure of a side member where the sub-roll rod device for mounting the powertrain in accordance with the present disclosure is mounted.
Figure 4:
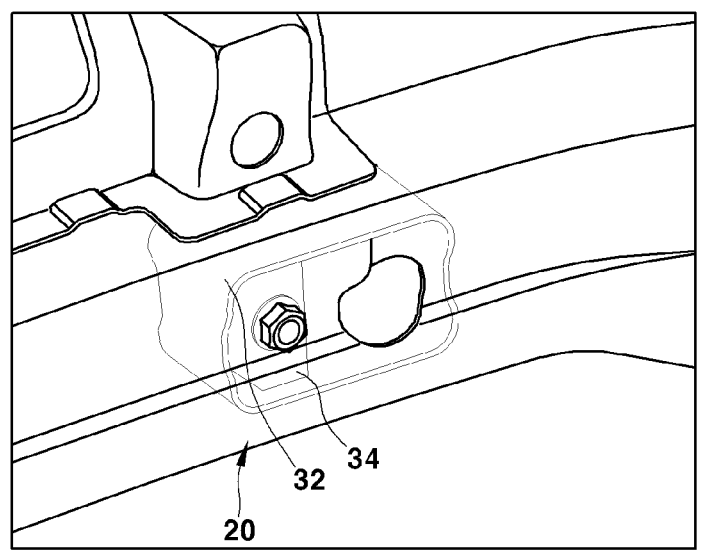

For this purpose, as illustrated in FIGS. 3 and 4, a sub-roll rod mounting hole 21 is formed by penetrating the side member 20, and the reinforcing case 30 for limiting a mounting space of the sub-roll rod is embedded inside the side member 20 through the sub-roll rod mounting hole 21.

Since the reinforcing case 30 is embedded upon the production of the side member 20 to function as reinforcing the side member 20 while limiting the mounting space of the sub-roll rod 10, it can replace the conventional two or more reinforcing plates that were separately mounted in the side member 20.

The reinforcing case 30 is composed of a box structural body 32 having a sub-roll rod receiving space 31 penetrated in the forward and backward in order to mount the sub-roll rod, a first fastening plate 33 formed on the opening portion of the inner side of the box structural body 32 to be fastened with the side member 20 through a welding nut, and a second fastening plate 34 formed on the opening portion of the outer side of the box structural body 32 to be fastened with the vehicle body fastening pipe 15 of the sub roll rod 10.

Figure 5:
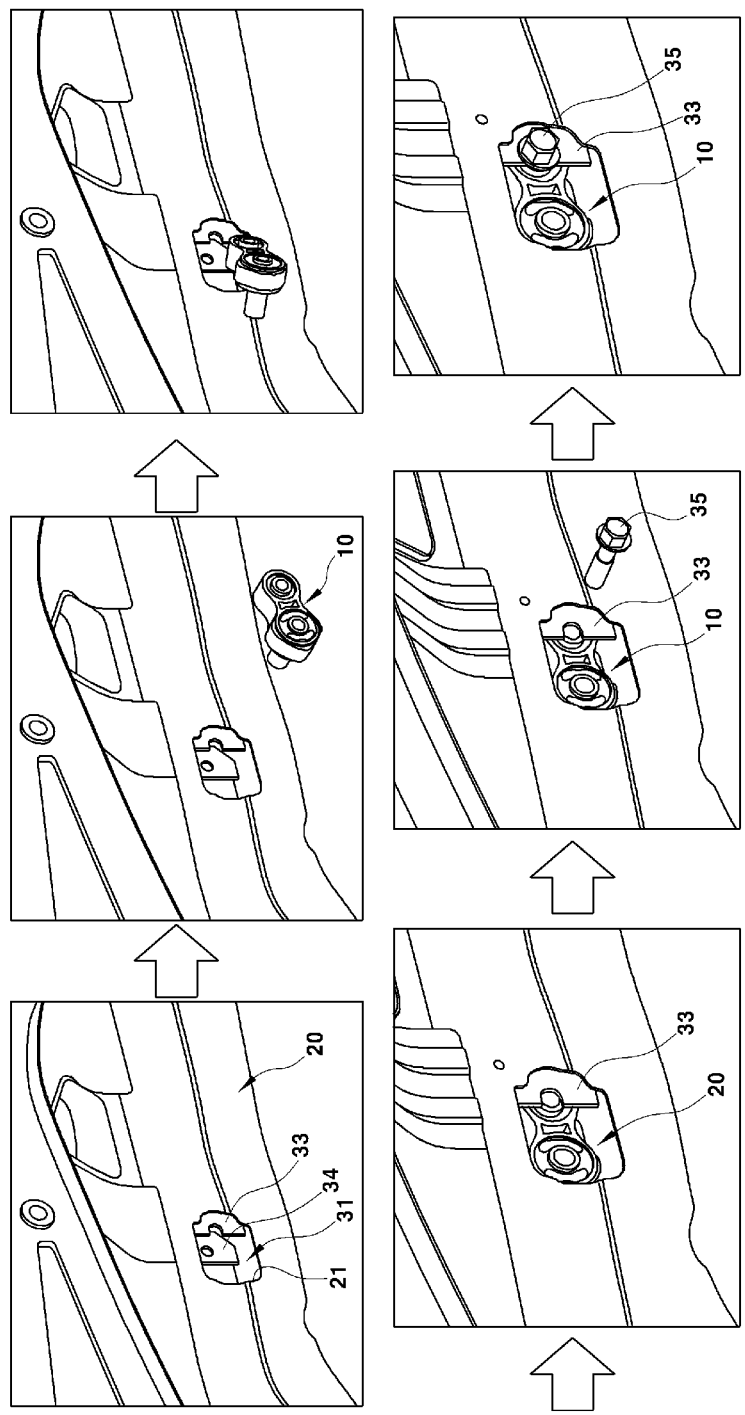
FIG. 5 is a perspective view illustrating the procedure mounting the sub-roll rod device for mounting the powertrain in accordance with the present disclosure inside the side member.

FIG. 5 illustrates the procedure mounting the sub-roll rod 10 in the reinforcing case 30 mounted inside the side member 20.

As illustrated in FIG. 5, by locating by inserting the sub-roll rod 10 into the reinforcing case 30 at the outer side of the side member 20 and then fastening a sub-roll rod fixing bolt 35 in the vehicle body fastening pipe 15 of the sub-roll rod 10 through the second fastening plate 34, the sub-roll rod 10 is fixedly mounted in the reinforcing case 30 in the side member 20.

The engine fastening pipe 14 of the sub-roll rod 10 becomes the state that is protruded toward the engine room through the inner side surface of the side member 20.

Figure 6:
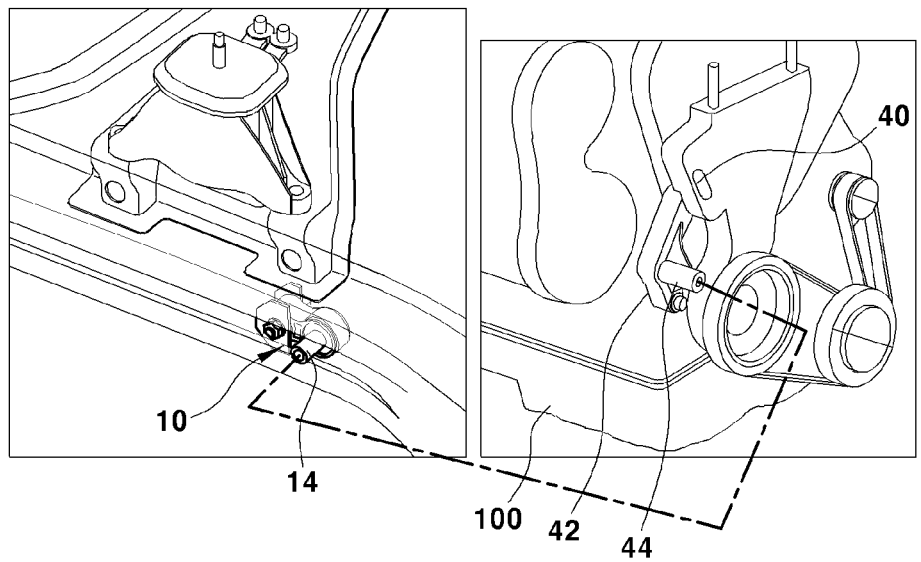
FIG. 6 is a perspective view illustrating that the sub-roll rod device for mounting the powertrain in accordance with the present disclosure is coupled by corresponding with an engine-side bracket of the powertrain.

Accordingly, as illustrated in FIG. 6, the engine fastening pipe 14 of the sub-roll rod 10 becomes the state that is protruded toward the engine room through the inner side surface of the side member 20 to be fastened with an engine-side bracket 42 of the powertrain 100 mounted in the engine room.

Preferably, the engine-side bracket 42 is provided as the structure that a hollow pipe 44 where the engine fastening pipe 14 of the sub-roll rod 10 is inserted and fastened is formed to be protruded, such that it can be integrally formed on a chain cover 40 of the engine, or separately mounted thereon.

Figure 7:
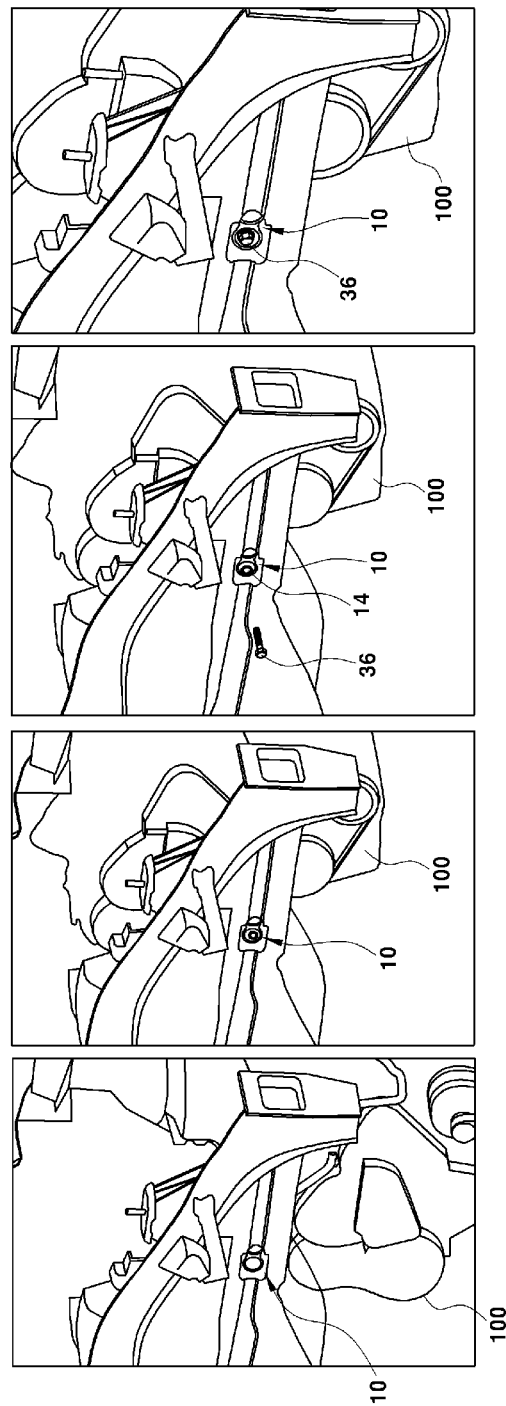
FIGS. 7 and 8 are perspective views illustrating that fastens the sub-roll rod device for mounting the powertrain in accordance with the present disclosure to the engine-side bracket of the powertrain.
Figure 8:
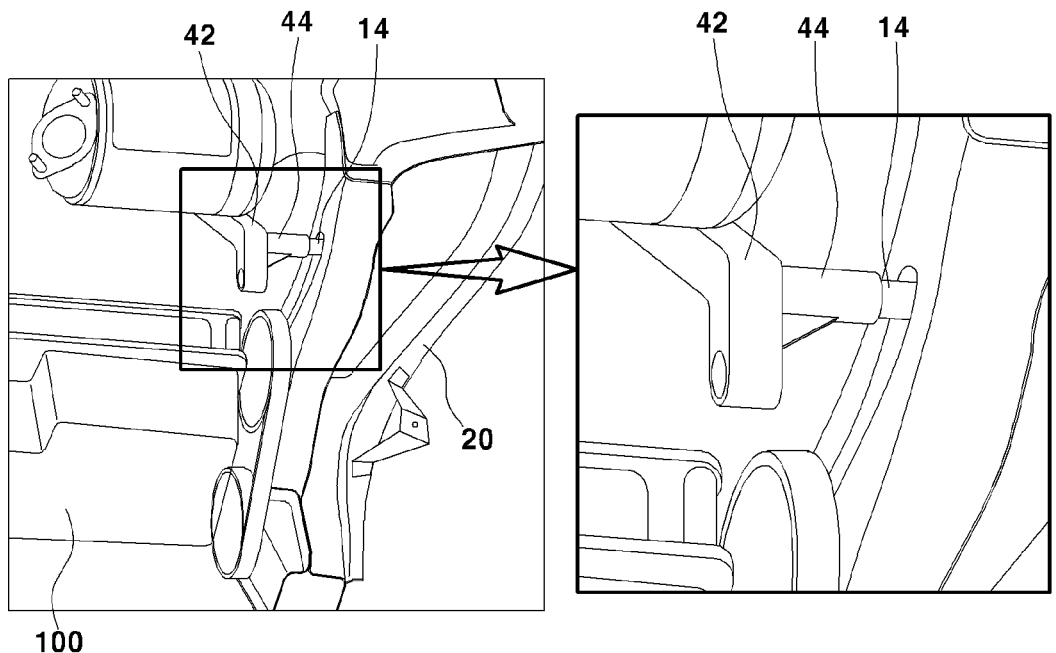

FIGS. 7 and 8 illustrate the state that mounts the powertrain in the engine room using the sub-roll rod in accordance with the present disclosure.

In the state that the engine fastening pipe 14 of the sub-roll rod 10 is protruded toward the engine room through the inner side surface of the side member 20, by entering the powertrain 100 from the bottom of the engine room to the top thereof and then inserting and fastening the engine fastening pipe 14 of the sub-roll rod 10 into the hollow pipe 44 of the engine-side bracket 42, the state that the powertrain 100 is located in position in the engine room.

Then, by inserting and fastening a reinforcing long bolt 36 into the inner portion of the engine fastening pipe 14 from the outside direction of the side member 20, the connection between the sub-roll rod 10 and the powertrain 100 is completed.

Figure 11:
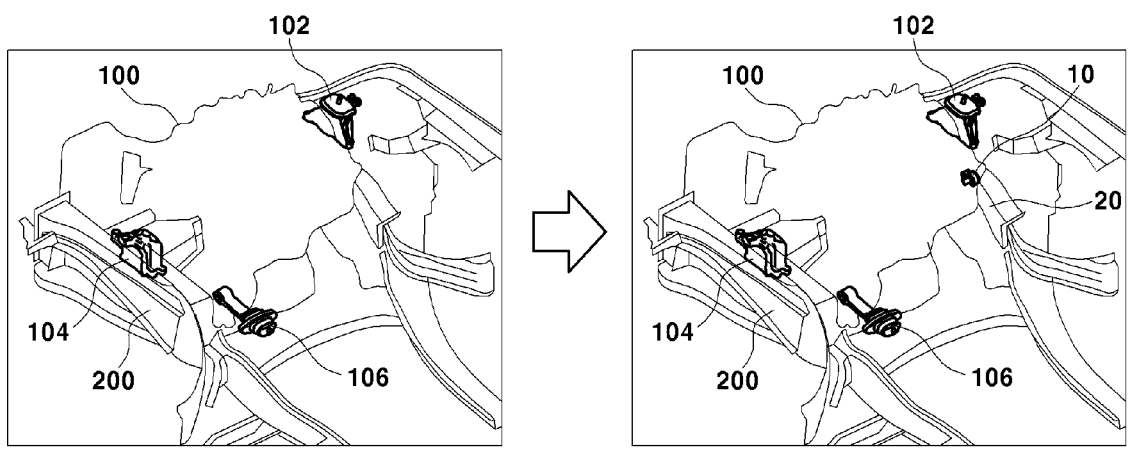
FIG. 11 is a view illustrating a comparison of a state of mounting the powertrain in the engine room in a conventional three-point supporting method, and a state of mounting the powertrain using the sub-roll rod of the present disclosure in the three-plus-one supporting method.

Thus, as illustrated in the left drawing of FIG. 11, instead of mounting the powertrain in the engine room in the conventional three-point supporting method, as illustrated in the right drawing of FIG. 11, in addition to the three-point supporting method, by mounting the sub-roll rod 10 that can be assembled with the powertrain 100 in the side member 20 to mount the powertrain 100 in the three-plus-one supporting method, it is possible to maintain NVH performance by the conventional three-point supporting method, and to control the forward-and-backward movement of the powertrain by the sub-roll rod.

That is, it is possible to absorb and remove impact and vibration at the sub-roll rod when the power train greatly moves in the forward and backward while performing roll (rotation) motion of the powertrain upon rapid acceleration and rapid braking of the vehicle.

In addition, as the engine fastening pipe 14 of the sub-roll rod 10 is inserted into and fastened to the hollow pipe 44 of the engine-side bracket 42, the mounting of the powertrain 100 to the engine room is performed, such that it is possible to exclude that the powertrain is mounted using a conventional separate jig.

Figure 10:
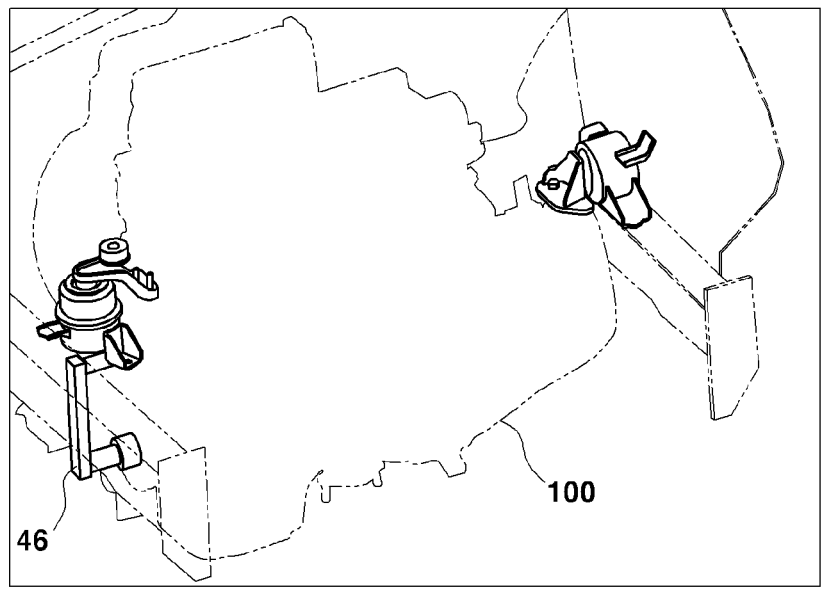
FIG. 10 (RELATED ART) is a view illustrating a conventional method using a jig when mounting the powertrain in the engine room.

That is, as illustrated in FIG. 10 (RELATED ART), conventionally, the powertrain was supported using a separate jig 46 such as a decking pin in order to mount the powertrain in the engine room, but the engine fastening pipe 14 is inserted into and fastened to the hollow pipe 44 of the engine-side bracket 42 to become the state that the powertrain 100 is fixedly mounted, such that it is possible to perform a subsequent powertrain assembly operation even without using the conventional separate jig 46.

Figure 9:
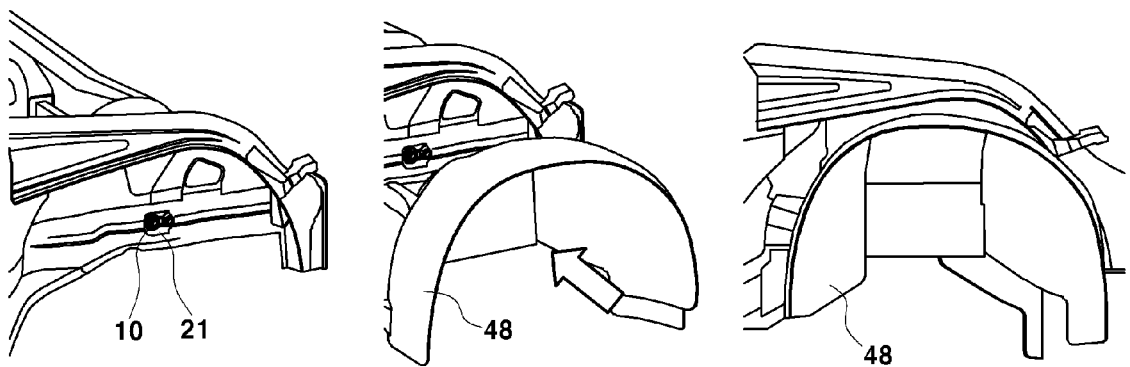
FIG. 9 is a perspective view illustrating that a side member mounting hole where the sub-roll rod device for mounting the powertrain in accordance with the present disclosure is embedded is covered by a wheel cover.

Meanwhile, the sub-roll rod mounting hole 21 formed at the outside of the side member 20 becomes the state that is exposed to the outside, but as illustrated in FIG. 9, the sub-roll rod mounting hole 21 can be covered in order not to be exposed by a wheel cover 48 located at the outside of the side member 20.

Having described the embodiments of the present disclosure in detail, the scope of the present disclosure is not limited to the above-described embodiments, and various modifications and improvements of those skilled in the art using the basic concept of the present disclosure as defined in the following claims are also included in the scope of the present disclosure.

What is claimed is:

1. A sub-roll rod device, comprising:
a powertrain mounted in an engine room in a four-point supporting method using an engine mount mounted between an engine of the powertrain and a vehicle body sub-frame, a transmission mount mounted between a transmission of the powertrain and the vehicle body sub-frame, and a roll rod mounted between a rear portion of the powertrain and the vehicle body sub-frame, and
a sub-roll rod being further mounted within a side member near the vehicle body sub-frame and fastened to a bracket formed on the engine.

2. The sub-roll rod device of claim 1, wherein the sub-roll rod comprises:
a body having a first through-hole and a second through-hole;
an engine fastening pipe located in an inner diameter center of the first through-hole of the body;
a vehicle body fastening pipe located in an inner diameter center of the second through-hole of the body;
a first elastic body interposed between the inner diameter surface of the first through-hole and the outer diameter surface of the engine fastening pipe; and
a second elastic body interposed between the inner diameter surface of the second through-hole and the outer diameter surface of the vehicle body fastening pipe.

3. The sub-roll rod device of claim 2, wherein a third elastic body for noise prevention is formed on the outer surface of the portion where the first through-hole is formed among the outer surface of the body.

4. The sub-roll rod device of claim 2, wherein the first elastic body is composed of an up-and-down directional elastic body vertically connecting the inner diameter surface of the first through-hole and the outer diameter surface of the engine fastening pipe, and a left-and-right directional elastic body formed at both sides of the inner diameter surface of the first through-hole in order to contact the outer diameter surface of the engine fastening pipe.

5. The sub-roll rod device of claim 1, wherein a sub-roll rod mounting hole is formed by penetrating the side member, and a reinforcing case for mounting the sub-roll rod is embedded inside the side member through the sub-roll rod mounting hole.

6. The sub-roll rod device of claim 5, wherein the reinforcing case is composed of a box structural body having a roll rod receiving space penetrated in a front of the box structural body and a back of the box structural body in order to mount the sub-roll rod, a first fastening plate formed on an inner side portion of the box structural body and fastened with the side member, and a second fastening plate formed on an outer side portion of the box structural body and fastened with the sub-roll rod.

7. The sub-roll rod device of claim 6, wherein a sub-roll rod fixing bolt is fastened in a vehicle body fastening pipe of the sub-roll rod through the second fastening plate.

8. The sub-roll rod device of claim 5, wherein the sub-roll rod mounting hole formed on the side member is covered by a wheel cover tightly coupled to an outside of the side member.

9. The sub-roll rod device of claim 2, wherein the bracket is formed on a chain cover of the engine, and is provided with a hollow pipe formed to protrude such that the engine fastening pipe of the sub-roll rod is inserted into the hollow pipe and fastened to the hollow pipe.

10. The sub-roll rod device of claim 9, wherein a reinforcing long bolt is inserted into and fastened to the engine fastening pipe.

* * * * *